United States Patent [19]

Chambley

[11] Patent Number: 4,505,952
[45] Date of Patent: Mar. 19, 1985

[54] METHOD FOR LUBRICATING AND CONDITIONING MONOFILAMENT FISHING LINES

[76] Inventor: Phillip W. Chambley, 20 Berkshire Dr., Rome, Ga. 30161

[21] Appl. No.: 210,828

[22] Filed: Nov. 26, 1980

[51] Int. Cl.³ .................. A01K 91/00; B05D 5/08; B32B 33/00
[52] U.S. Cl. .................. 427/155; 43/44.98; 428/394; 428/395
[58] Field of Search .............. 43/44.98; 427/155; 428/394, 395

[56] References Cited

U.S. PATENT DOCUMENTS 3,057,040 10/1962 Cuculo .................. 43/44.98
3,523,034 8/1970 Howald .................. 428/389

FOREIGN PATENT DOCUMENTS 51-13689 2/1976 Japan .................. 43/44.98
55-77843 6/1980 Japan .................. 43/44.98

OTHER PUBLICATIONS

*Popular Mechanics*, Oct., 1939, p. 592.

Primary Examiner—James C. Cannon
Attorney, Agent, or Firm—Evelyn M. Sommer

[57] ABSTRACT

The original "finish" or the lubricating softener applied by the manufacturer to monofilament fishing line to modify its surface frictional properties can be replaced by the application to the line and/or the guide surfaces of the rod and reel of a small amount of an aqueous solution of a compound used heretofore to modify the frictional properties and hand of fibers prior to forming textiles, fabrics and carpeting therefrom.

6 Claims, No Drawings

METHOD FOR LUBRICATING AND CONDITIONING MONOFILAMENT FISHING LINES

This invention relates to a method for the replacement of surface friction reducing agents on fishing lines, particularly lines formed of monofilament nylon and used with bait-casting and spin-casting rods and reels. More particularly this invention relates to a method for the replacement of surface friction reducing agents on fishing lines by application thereto of a liquid composed at least in part of a spinning or processing lubricant and/or softener such as is used in the manufacture of nylon yarns and carpets.

It is characteristic of monofilament fishing line that the more it is used, the more poorly it performs. This is due to an increase in the frictional drag between the fishing line and surfaces on the rod and reel which contact the fishing line. Generally, when it becomes necessary to replace the monofilament line on a rod and reel, it is not because the line itself has worn out, but because the low-friction coating that had been placed on the line as a part of the manufacturing process has been lost.

During the manufacture of monofilament fishing line, it is coated with any one of a large number of substances referred to in the industry as "finishes" and which can be more accurately described as lubricating softeners which modify the surface frictional properties of the line. This "finish" serves as an aid in the manufacturing process and also causes the line to perform well in use.

As in fishing it is necessary for the fishing line to be in more or less continuous contact with water, the factory applied "finish" or lubricant is eventually washed off of the line. As a result, there is a steady increase in the surface friction of the line, resulting in a coincident decrease in line performance. Using a lure of equal weight but with increased frictional drag, the lure cannot be cast as far.

The accuracy of the lure's placement in casting also suffers due to the increased frictional drag. The loss of the surface treatment causes the line to become less supple and eventually harsh and brittle. This results in the fishing line developing a set curl as a result of its having been stored on the cylindrical spool of the fishing reel.

For a number of years there has been a system for cleaning and imparting flotational properties to the type of fishing line which is used in so called "fly fishing." The aforesaid system is in no manner similar to the lubricating and conditioning method forming the subject matter of this invention. In order to appreciate the dissimilarity of these two methods and to clearly establish the uniqueness of the method of the invention, it is necessary to appreciate the differences between fly fishing and bait or spin casting.

Fly fishing involves the use of a long, slender rod provided with guides to carry the fishing line along the length of the rod. A reel or spool is attached to the handle end of the rod, its purpose being for line storage when not fishing. The great difference between fly fishing and spin/bait casting lies in the type of line used and the casting and retrieving methods employed.

In fly fishing, with the rod handle held in this instance by the right hand, the left hand strips several yards of line from the storage reel with the line either being held in coils by the left hand or allowed to form a long loop extending between the left hand and the line storage reel. By bringing the rod tip rearward then, forward in "buggy-whip" fashion, and by releasing the line held in the left hand at approximately the top of the forward moving arc of rod motion, the line and therewith the lure, are propelled forward toward the desired fishing location. The line used in fly fishing is conventionally of large-diameter braided construction, generally having an outer coating of plastic applied thereon. The diameter of this line is on the order of 1/32 to 1/16 inch. It is the weight of the line, not that of the lure, whose forward momentum propels the lure and which by slippage of the predetermined amount of slack line through the rod guides, extends the casting distance. It is generally desirable that the line used in fly fishing float on top of the water's surface. This is particularly true when top water lures, i.e. lures that are supposed to float, are used. If a fly line sinks, its heavy weight causes the lure to sink also, thereby rendering the lure ineffective. It is for this reason that there has been for many years a practice of coating the heavy braided fly line with a wax-like substance. This has the dual purpose of cleaning the line of debris, and simultaneously coating the line with a high surface tension wax-like substance which causes the line to float.

The application of a waxy material to the line involves removal of the line from the storage reel and then using a cloth or pad impregnated with the waxy substance, folded over the line, drawing the length of the line through and across the tightly held impregnated pad, whereby there is deposited a coating of the flotation imparting material onto the line. This operation might be required to be repeated several times during a single day of fishing, depending on the quality and condition of the fly line.

Sufficient similarity exists between spin-casting and bait-casting so that these two fishing systems can be discussed as one and the great difference between spin/bait casting and fly fishing still made apparent.

Casting involves the use of a somewhat smaller and stiffer rod than is used in fly fishing. The casting rod has guides situated along its length through which the fishing line passes, and there is a hand operated reel or spool onto which the line is wound which operates to let out or take up line each time a cast or retrieve is made.

Unlike fly fishing, where as previously mentioned the fishing line is made available to lengthen the casting distance and then retrieved for another cast entirely by, for example the left hand, in bait/spin casting the line is pulled directly from the storage reel by the weight and forward momentum of the lure as it is cast. Retrieval of the lure is effected each time by rewinding the line onto the reel spool by means of a hand-operated crank which causes the spool to turn and take up the line.

The type of line used in casting differs from that which is used in fly fishing in that, in the case of spin casting, the line used is exclusively monofilament, and, in bait-casting, almost exclusively so. Monofilament fishing lines are generally made of nylon, and range from 0.002 to 0.050 inch in diameter. In casting, because of the much greater size and weight of the lure as compared to the line which differs from the existing situation in fly fishing, whether or not the line sinks is of no consequence.

In casting, the forward-thrown lure has to pull line from the spool of the reel so that line tensions are much higher in casting than in fly fishing, due to the drag from the reel spool being multiplied by the well known Capstan Friction phenomenon, which is represented by the following equation:

$$T_r = T_t e^{f a}$$

Where
- $T_r$ is the total resultant drag on the line. It is this drag that limits casting distance
- $T_t$ is the tension required to pull the line from the reel spool
- e is the base of the Napierian system of logarithms
- f is the coefficient of friction of the fishing line
- a is the wrap angle of the fishing line in its contact with the rod guides and the reel spool.

It can be appreciated that as the coefficient of friction of the fishing line increases, the drag against the casting distance increases exponentially.

For this reason, the loss of "finish" or lubricant from a fishing line in spin/bait casting has a dramatic negative effect on line performance and behavior. Thus, the need for a method to easily replace lost lubricant becomes readily apparent.

Another problem associated with monofilament fishing lines arises because the lines are stored on the reel spool under tension and because they are much more highly oriented in structure than are the braided lines used in fly fishing, they have a tendency to develop a set curl or spiral. This is a manifestation of the elastic memory of their having been held in a spiral-like configuration while stored on the cylindrical reel spool. This tendency is not too great in the case of new lines, but increases with continued use of the line. It has been observed that older lines treated in accordance with the method of the invention reverted within minutes to their original curl-free condition. This has proven of great benefit in plastic worm fishing, when it is necessary to watch the line to determine when to set the hook in a biting fish.

This invention is not specifically directed for use on the braided type fly fishing lines, although considerable benefit can be obtained in treating the short (2-6 ft.) portion of monofilament that is normally tied between the braided line and the lure. The invention is primarily intended for, although not limited to, use on monofilament fishing lines used in bait and spin casting.

It is an object of this invention to provide a treatment for monofilament fishing lines, so that the fisherman can maintain line performance by replacing the lubricant present on the line when new, but which has been washed away in the process of fishing.

It is another object of this invention to provide a treatment for monofilament fishing line that will, by rendering the line soft and supple, reduce or eliminate its tendency to maintain a set spiral or curl from having been stored on a cylindrical reel spool.

Yet another object of the invention is to provide a method of treating fishing line which can be carried out without the fisherman having to interrupt his fishing activities and strip line from the spool and wipe it along its length.

These and other objects and advantages of the invention will become apparent from a consideration of the following disclosure and claims.

In accordance with the invention it has now been found that the behavior and useful life of fishing line and more particularly line formed of monofilament nylon is substantially improved by the replacement of the surface frictional reducing agents that have been applied during manufacture of the line but which have been washed away by contact with the water being fished in, if as lubricant there is used a solution composed at least in part of a spinning or processing lubricant and/or softener such as is used in the manufacture of nylon carpet yarn and carpets and if this solution is dispensed in drop form directly onto the line surface of a filled reel spool of fishing line. The solution permeates the spool of line by flowing between the interstices of line wound up on the spool.

On casting the lure, the newly conditioned and lubricated line carries lubricant to the guides positioned along the length of the rod lubricating them as well.

The crux of the invention lies in the finding that the original "finish" or lubricating softener applied by the manufacturer to modify the surface frictional properties of the line can be replaced by use of many of the chemical compounds used to modify the frictional properties and hand of fibers prior to their use to form textiles, fabrics and carpeting.

In the textile and carpet manufacturing industry, there are a large number of readily available chemical compounds which are used to modify the frictional properties of the yarns and fibers. These compounds are used specifically for the purpose of facilitating and enhancing the conversion of fibers to fabrics. Obviously, fibers that are soft and well lubricated will process more easily and efficiently through textile machinery, than will fibers that are harsh, raspy and not well lubricated.

Likewise, there are many chemical compositions available that are employed to cause nylon and other fabrics to be softer to the touch i.e., to improve their hand.

Examples of such compositions and compounds are Sylube R and Magic GT, both mnaufactured by Lutex Chemical Corporation of Chattanooga, Tenn.

It has now been discovered that these such chemicals, when applied to monofilament nylon fishing line, greatly improve the casting performance and useful life of the fishing line.

The lubricant Magic GT, for example, when mixed in a ratio of one part Magic GT to nine parts water, produced the following results when tested by three fishermen, using previously fished-with monofilament line:
1. An increase of 10 to 30% in casting distance.
2. Improved casting accuracy due to fewer curls in the line.
3. Fewer line tangles, known to fishermen as "backlashes."

Treatment in accordance with the invention involves dispensing drops of the lubricating and/or softening liquid directly onto the line as contained on a filled reel spool.

In the actual carrying out of the method by the fishermen, 4-5 drops of the solution containing the lubricant are applied from a drop dispensing bottle directly onto the full reel spool of the fishing line.

The invention is exemplified by the following:

A composition was prepared by mixing one part Sylube R with five parts water; the line is DuPont Golden Stren, fourteen pound test. The line as used had been used in one previous fishing trip. The method of application comprised applying 4 to 5 drops of the Sylube R solution onto the line before casting. A significant improvement was observed in the casting distance and accuracy as compared to that which existed before such application.

Other available textile manufacturing lubricants including Magic GT and textile softeners were evaluated with similar results being obtained.

Surprisingly, the ratio of water to lubricant/softener compounds appears to have little effect on performance and dilutions of up to about 35 to 1 have proved effective. It is believed that this is due to the hydrophobic nature of the monofilament line and to the finding that the excess lubricant which is introduced and which is not adsorbed by the monofilament line is carried to the guides on the rod and reel lubricating them as well.

Testing carried out by the applicant indicates that there are benefits obtained when the textile lubricants are applied only to the guide surfaces of the rod and reel, although this is not as great as that observed when the lubricants are applied to the fishing line as above described. Repeated testing of the instant method of improving fishing line performance by replacement of the lost lubricant therefrom has confirmed that this method is of considerable value to the fishing enthusiast.

I claim:

1. The new use of a synthetic yarn and fiber processing agent selected from the group consisting of lubricants and softening agents as used in the manufacture of nylon yarns and carpets, consisting of the steps of preparing an aqueous solution of said processing agent and applying said solution in drop form directly onto monofilament cast fishing line as contained on a filled reel spool.

2. A new use of claim 1 wherein said monofilament cast fishing line is a monofilament nylon fishing line.

3. The new use of claim 1 wherein said synthetic yarn and fiber processing agent is a lubricating agent.

4. A new use of claim 3, wherein said solution additionally contains a softening agent.

5. A new use of claim 1 wherein said solution contains one part of fiber processing agent to 5 to 35 parts of water.

6. A new use of claim 1 wherein said solution is additionally applied onto the fishing rod and reel guide surface.

* * * * *